United States Patent
Bhat et al.

(10) Patent No.: US 11,574,121 B2
(45) Date of Patent: Feb. 7, 2023

(54) EFFECTIVE TEXT PARSING USING MACHINE LEARNING

(71) Applicant: Kyndryl, Inc., New York, NY (US)

(72) Inventors: Gautam K. Bhat, Mangalore (IN); Muniyandi Perumal Thevar, Madurai (IN); Nalini M, Chennai (IN); Sarita Lavania, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 250 days.

(21) Appl. No.: 17/156,864

(22) Filed: Jan. 25, 2021

(65) Prior Publication Data
US 2022/0237375 A1 Jul. 28, 2022

(51) Int. Cl.
*G06F 40/279* (2020.01)
*G06N 3/04* (2006.01)
*G06F 40/30* (2020.01)
*G06F 40/205* (2020.01)
*G06F 40/247* (2020.01)
*G06N 3/08* (2006.01)

(52) U.S. Cl.
CPC .......... *G06F 40/279* (2020.01); *G06F 40/205* (2020.01); *G06F 40/247* (2020.01); *G06F 40/30* (2020.01); *G06N 3/0445* (2013.01); *G06N 3/08* (2013.01)

(58) Field of Classification Search
CPC ..... G06F 40/247; G06F 40/279; G06F 40/205
See application file for complete search history.

(56) References Cited

U.S. PATENT DOCUMENTS

| | | | | |
|---|---|---|---|---|
| 5,822,720 | A * | 10/1998 | Bookman | G09B 19/06 345/157 |
| 6,205,456 | B1 * | 3/2001 | Nakao | G06F 16/345 715/201 |
| 6,461,166 | B1 | 10/2002 | Berman | |
| 7,074,128 | B2 | 7/2006 | Berman | |
| 11,188,711 | B2 * | 11/2021 | Krasadakis | G06F 40/47 |
| 2008/0076107 | A1 | 3/2008 | Berman | |
| 2010/0217768 | A1 | 8/2010 | Yu | |
| 2017/0046345 | A1 | 2/2017 | Takahashi | |
| 2018/0160200 | A1 * | 6/2018 | Goel | G06F 16/43 |
| 2019/0278835 | A1 | 9/2019 | Cohan et al. | |
| 2019/0332719 | A1 | 10/2019 | Keskar | |
| 2019/0386937 | A1 | 12/2019 | Kim | |
| 2021/0209356 | A1 * | 7/2021 | Wang | G06V 30/40 |
| 2022/0237375 | A1 * | 7/2022 | Bhat | G06N 3/0445 |

* cited by examiner

*Primary Examiner* — Samuel G Neway
(74) *Attorney, Agent, or Firm* — Patterson + Sheridan, LLP

(57) ABSTRACT

Techniques for data evaluation using machine learning are provided. A textual document is received, and the textual document is parsed using a recurrent neural network (RNN) to extract a plurality of keywords. A first subset of keywords which are known by a user and a second subset of keywords which are unknown by the user are each identified. A summary of the textual document is generated based on the second subset of keywords. The summary is output, comprising: outputting information related to a first keyword of the second subset of keywords and, upon determining that the first keyword is understood by the user, outputting information related to a second keyword of the second subset of keywords.

20 Claims, 6 Drawing Sheets

EFFECTIVE TEXT PARSING USING MACHINE LEARNING

BACKGROUND

The present disclosure relates to machine learning, and more specifically, to using machine learning to parse text in order to generate keyword summaries.

Machine learning has been applied to a variety of text processing problems. Natural language text, however, can be highly complex and it is difficult or impossible to efficiently and effectively extract meaningful data. As the volume of text increases, scalability problems cause the time required to read and parse the data to increase rapidly, and the resulting accuracy of the data extraction can be significantly reduced. Existing systems are not able to effectively or accurately extract meaningful data from textual content in a way that allows the data to be consumed efficiently.

SUMMARY

According to one embodiment of the present disclosure, a method is provided. The method includes receiving a textual document; parsing the textual document using a recurrent neural network (RNN) to extract a plurality of keywords; identifying a first subset of keywords, from the plurality of keywords, which are known by a first user; identifying a second subset of keywords, from the plurality of keywords, which are unknown by the first user; generating a summary of the textual document based on the second subset of keywords; and outputting the summary, comprising: outputting information related to a first keyword of the second subset of keywords; and upon determining that the first keyword is understood by the first user, outputting information related to a second keyword of the second subset of keywords.

According to one embodiment of the present disclosure, one or more computer-readable storage media are provided. The one or more computer-readable storage media collectively contain computer program code that, when executed by operation of one or more computer processors, performs an operation. The operation includes receiving a textual document; parsing the textual document using a recurrent neural network (RNN) to extract a plurality of keywords; identifying a first subset of keywords, from the plurality of keywords, which are known by a first user; identifying a second subset of keywords, from the plurality of keywords, which are unknown by the first user; generating a summary of the textual document based on the second subset of keywords; and outputting the summary, comprising: outputting information related to a first keyword of the second subset of keywords; and upon determining that the first keyword is understood by the first user, outputting information related to a second keyword of the second subset of keywords.

According to one embodiment of the present disclosure, a system is provided. The system includes one or more computer processors, and one or more memories collectively containing one or more programs which when executed by the one or more computer processors performs an operation. The operation includes receiving a textual document; parsing the textual document using a recurrent neural network (RNN) to extract a plurality of keywords; identifying a first subset of keywords, from the plurality of keywords, which are known by a first user; identifying a second subset of keywords, from the plurality of keywords, which are unknown by the first user; generating a summary of the textual document based on the second subset of keywords; and outputting the summary, comprising: outputting information related to a first keyword of the second subset of keywords; and upon determining that the first keyword is understood by the first user, outputting information related to a second keyword of the second subset of keywords.

DETAILED DESCRIPTION

Embodiments of the present disclosure provide techniques to generate keyword summaries for textual data using neural networks. In some embodiments, a keyword system parses textual input data (e.g., natural language text) to generate a set of keywords (which may include words, terms, or phrases) for each topic, chapter, or section of the input text. In at least one embodiment, the system can further generate topic or section summaries based in part on the identified keywords. Additionally, in some embodiments, the system can maintain a repository of known and unknown keywords in order to facilitate efficient and complete understanding of the underlying textual data.

For example, in one embodiment, given a section of textual data (e.g., a chapter in a book), the system can extract keywords, identify keywords which are unknown to a user (e.g., the reader), generate a summary based on these unknown keywords, and output the summaries to the user. As the user reviews and interacts with the summaries, these unknown keywords become known and the underlying repository can be updated dynamically to more efficiently evaluate and present future textual data.

In some embodiments, textual documents (such as books) can be provided to the keyword system. The system can then parse the text (e.g., using a neural network) to populate important keywords for the text, as well as portions or data related to such keywords. In at least one embodiment, the system orders the keywords to reflect the sequence in which the text is written. Based on these keywords, the system can summarize and output concepts from the overarching text, which can be used as an effective and rapid way of ingesting and understanding the text.

Figure 1:
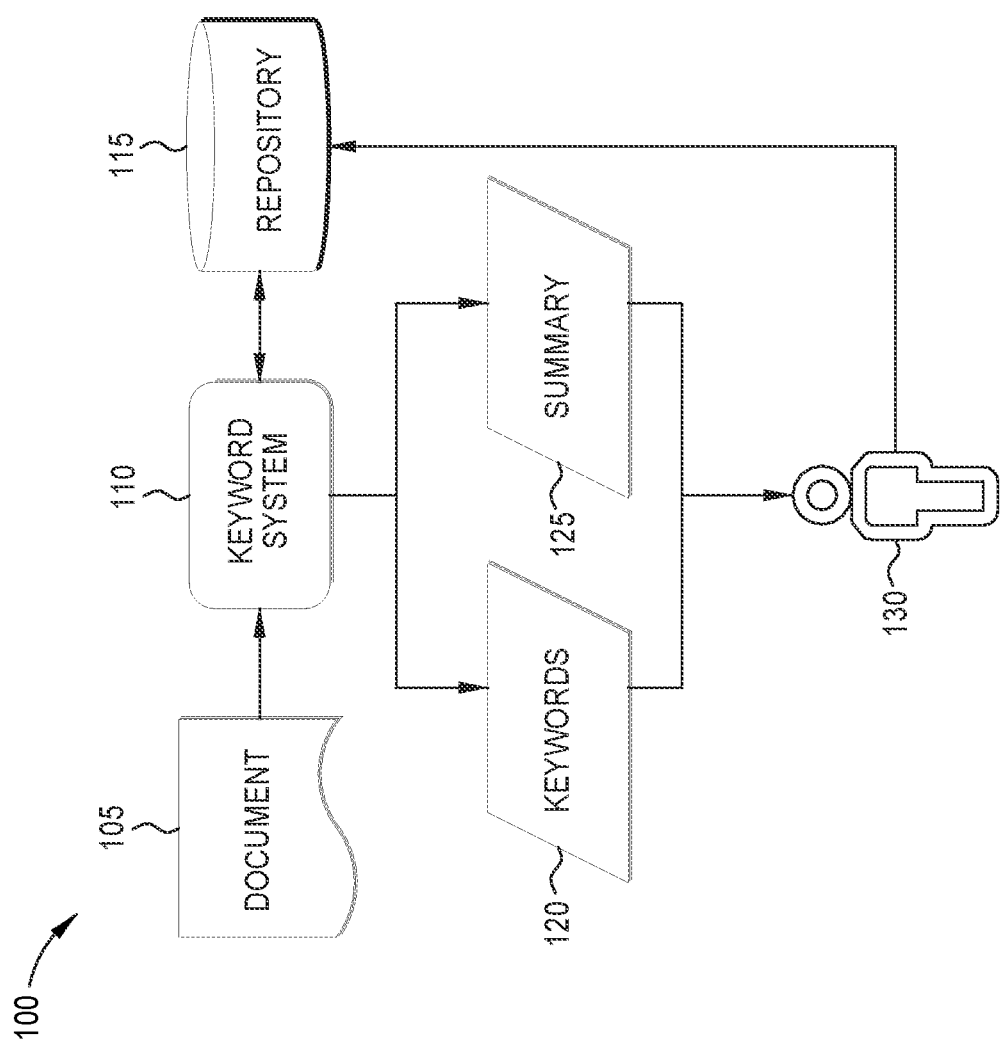
FIG. 1 depicts a workflow for text parsing to extract key terms and generate data summaries, according to some embodiments disclosed herein.

FIG. 1 depicts a workflow 100 for text parsing to extract key terms and generate data summaries, according to some embodiments disclosed herein. In the illustrated embodiment, a Document 105 is provided to a Keyword System 110. In embodiments, the Document 105 contains textual data. In some embodiments, the textual data is natural language. For example, the Document 105 may be a book, an article, and the like.

In at least one embodiment, the Document 105 is an electronic representation of textual data. For example, the Document 105 may be an eBook. In some embodiments, the Document 105 is provided by a user that wishes to consume the text. For example, a user may upload or otherwise provide an indication of a book for processing. In the illustrated embodiment, the Keyword System 110 parses the Document 105 to generate a set of Keywords 120 and Summaries 125.

In some embodiments, to do so, the Keyword System 110 relies at least partially on a Repository 115. In at least one embodiment, the Repository 115 includes a set of known words for one or more users. In an embodiment, a word is considered "known" to a given user if the user is familiar with it and understands its meaning. In some embodiments, users can indicate known words. In at least one embodiment, as users interact with the Keyword System 110, the set of known words can be dynamically updated to reflect new understanding.

In some embodiments, the Keyword System 110 uses one or more neural networks to generate the set of Keywords 120 and/or Summaries 125. In one embodiment, a recurrent neural network (RNN) is used to extract key terms from the text. In one embodiment, sentences in the text can be iteratively provided to the RNN to identify key words or concepts for the collection of sentences. For example, a first sentence in a paragraph may be provided as input, and the output activations from the RNN, along with the next sentence in the paragraph, can be provided as input to the next layer of the network. After the last sentence in the section is provided, the resulting output may be used as the keyword for the group of sentences (e.g., for the paragraph).

In some embodiments, the Keyword System 110 can compare the set of identified and/or generated keywords against the Repository 115 in order to identify the set of Keywords 120 that should be provided to the User 130. For example, as discussed above, the Keyword System 110 may present the unknown keywords before the known keywords (or may refrain from presenting the known keywords entirely). In some embodiments, the Repository 115 can also include information such as word(s) or terms associated with the author of the Document 105, regional-specific language, terms found in social media reviews of the Document 105.

In at least one embodiment, the Keyword System 110 can generate a Summary 125 for each Keyword 120. This Summary 125 may indicate, for example, the context of the Keyword 120 (e.g., one or more sentences in the Document 105 that are relevant to the Keyword 120), a definition for the Keyword 120, and the like. In some embodiments, the Keyword System 110 can generate an overarching Summary 125 for the Document 105 (or portions thereof) based on the Keywords 120. For example, based on the sequential order of the Keywords 120 and/or the surrounding context, the Keyword System 110 may generate a shortened Summary 125 that reflects the concepts and flow of the Document 105.

In the illustrated embodiment, as the User 130 reviews the Keywords 120 and/or Summary 125, the Repository 115 is updated. For example, in one embodiment, the User 130 can select each Keyword 120 in turn to retrieve the corresponding context or meaning. When the User 130 indicates understanding (e.g., via a button on an interface), the Repository 115 can be updated to reflect that the User 130 understands the keyword. In some embodiments, the system can then move to the next Keyword 120, allowing the User 130 to sequentially interact with and understand the Document 105.

In one embodiment, when the User 130 subsequently indicates another Document 105 they wish to review, the Keyword System 110 can generate a new set of Keywords 120 based on this updated Repository 115 in order to reflect the growing knowledge of the User 130. This allows textual documents to be quickly and efficiently parsed and understood.

Figure 2:
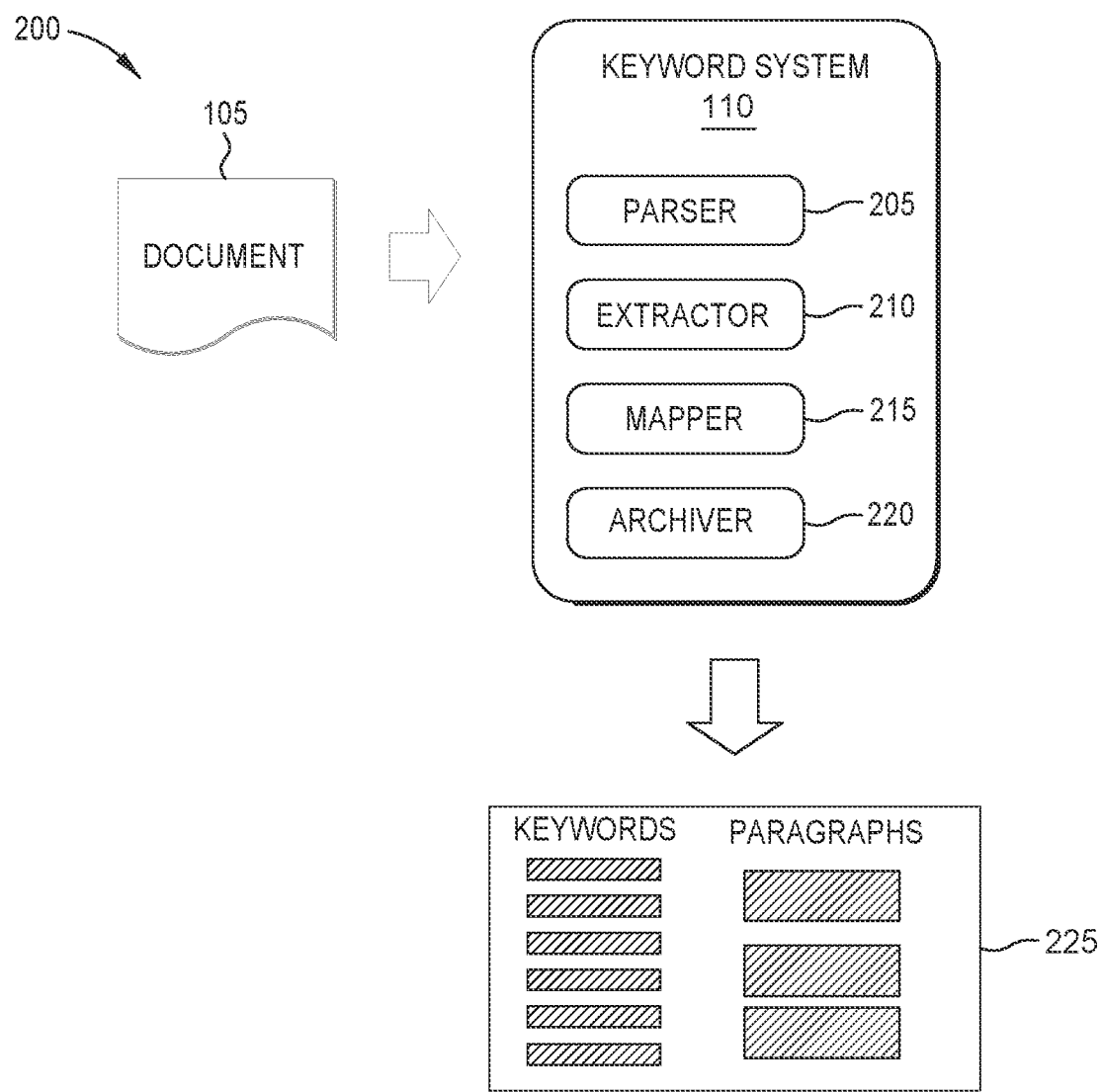
FIG. 2 illustrates a keyword system configured to use machine learning to parse textual data, according to some embodiment disclosed herein.

FIG. 2 illustrates a Keyword System 110 configured to use machine learning to parse textual data, according to some embodiment disclosed herein. In the illustrated embodiment, the Keyword System 110 includes a Parser 205, Extractor 210, Mapper 215, and Archiver 220. Although depicted as discrete components for conceptual clarity, in embodiments, the operations of the Parser 205, Extractor 210, Mapper 215, and Archiver 220 may be implemented across any number of components and devices.

In an embodiment, the Parser 205 can parse the input Documents 105 to delineate logically distinct sections. For example, the Parser 205 may split the input text into individual sentences, paragraphs, sections, chapters, or any other logical separation. In some embodiments, the Parser 205 parses the text to extract a hierarchical structure. For example, the Parser 205 may split each sentence and identify, for each sentence, the corresponding paragraph, sub-heading, heading, and/or chapter. In some embodiments, this allows the Keyword System 110 to construct a sequential set of keywords for review, as well as to better understand the overarching structure and flow of the Document 105.

In one embodiment, the Extractor 210 evaluates each delineated portion of text provided by the Parser 205 in order to generate a corresponding keyword. In this way, the Extractor 210 extracts meaning from the Document 105. In at least one embodiment, the Extractor 210 uses a trained neural network (e.g., an RNN) to iteratively evaluate each portion of the Document 105. For example, in one embodiment, the Extractor 210 can input the first sentence of a given paragraph to the RNN. The resulting activations may then be provided to a next layer, along with the next sentence. When each sentence in a paragraph has thus been processed, the resulting output may be used as the keyword for the paragraph.

In some embodiments, the Extractor 210 can similarly evaluate the keywords to generate overarching concepts for multiple sections (e.g., for multiple paragraphs). For example, the Extractor 210 may provide the keywords sequentially as input to the RNN, with the final output acting as an overall keyword or concept for the underlying portion of the Document 105 represented by the individual keywords.

In an embodiment, the Mapper 215 can map the generated keywords against a repository in order to establish more context and identify known and unknown words. For example, in at least one embodiment, the Mapper 215 can compare the keywords against a set of known words for a given user, and classify each keyword as known or unknown. In some embodiments, the Mapper 215 can also search for synonyms (e.g., if the user does not know the specific keyword but is familiar with a synonym).

In some embodiments, to provide further context, the Mapper 215 can determine whether each keyword has previously been used by the author of the Document 105 (or by other authors), whether it is common for the specific type or genre of the Document 105, whether it is regional-specific, whether it has been used in reviews or other references to the Document 105 (e.g., on social media), and the like. This information can allow the Mapper 215 to provide additional context and understanding for each keyword.

In an embodiment, the Archiver 220 can dynamically update the repository as the user reviews the keywords. For example, as the user indicates understanding, the Archiver 220 can update the repository. In some embodiments, the Archiver 220 can further update the repository based on the text itself. For example, the Archiver 220 may update a profile of the author and/or the Document 105 to indicate that the keywords were present. This may improve efficiency of future operations with the Document 105.

In the illustrated embodiment, the Keyword System 110 outputs a graphical user interface (GUI) 225 that indicates one or more keywords and corresponding paragraphs. In some embodiments, when a user selects a keyword, the GUI 225 updates to display paragraph(s) from the Document 105 that are relevant to the keyword. In at least one embodiment, the GUI 225 may also indicate other contextual data (e.g., determined by the Mapper 215), such as the definition of the keyword, other examples (e.g., in other documents or from other authors), and the like. This can allow the user to more readily understand the full depth of the keywords, and therefore the concepts reflected in the Document 105.

Figure 3:
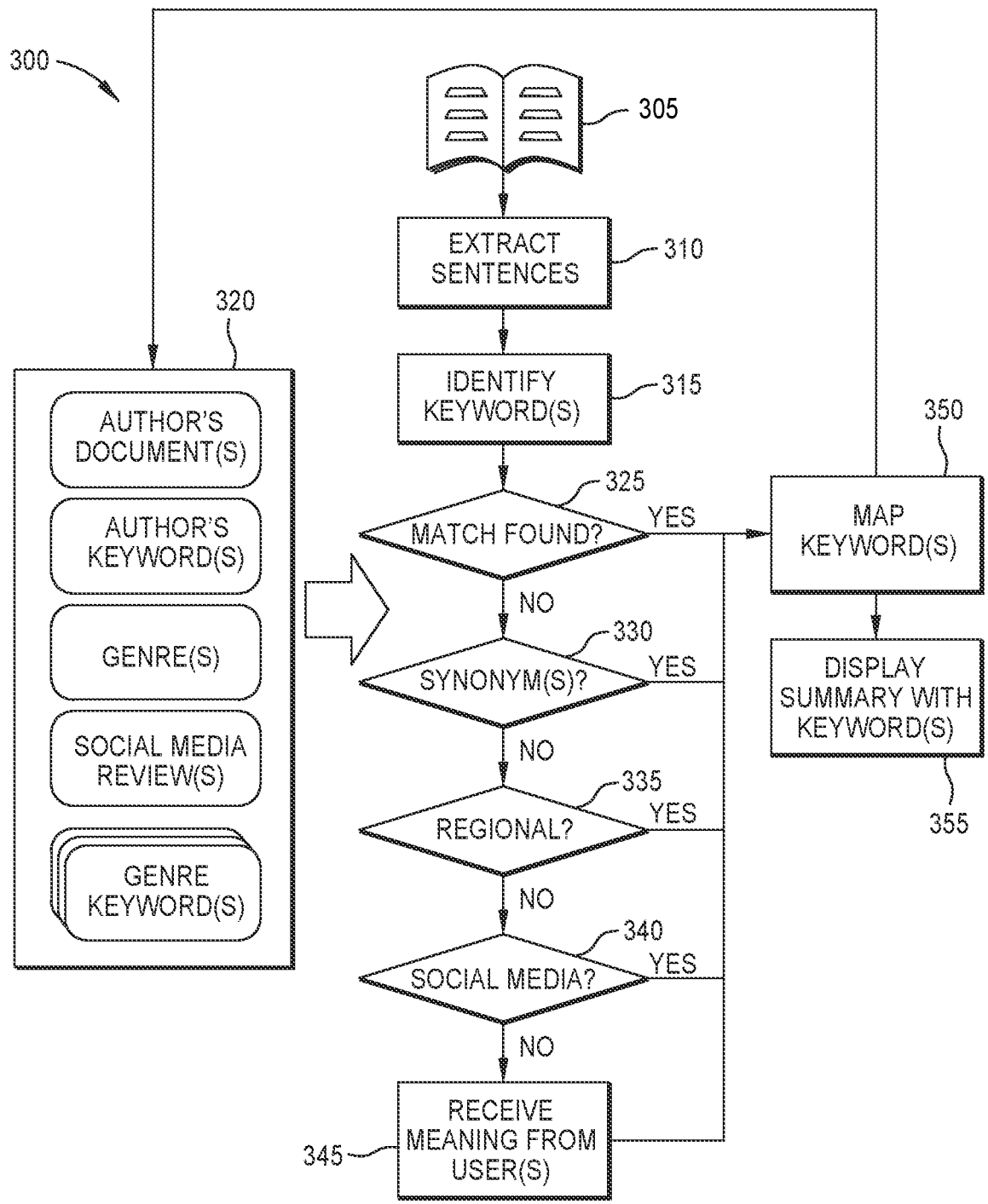
FIG. 3 depicts a workflow for parsing textual data and generating user interfaces based on the extracted data, according to some embodiments disclosed herein.

FIG. 3 depicts a workflow 300 for parsing textual data and generating user interfaces based on the extracted data, according to some embodiments disclosed herein. The illustrated workflow 300 begins when a Document 305 (e.g., a book) is provided. At block 310, the Keyword System 110 can extract individual sentences from the input Document 305. The workflow 300 then continues to block 315.

At block 315, the Keyword System 110 identifies one or more keywords for each portion (e.g., each sentence) in the input Document 305. In the illustrated workflow 300, blocks 325, 330, 335, and 340 are performed based on a Repository 320. At block 325, the Keyword System 110 determines whether each identified keyword (from block 315) is already reflected in one or more existing sources. In the illustrated embodiment, the Keyword System 110 determines whether the keyword was used in any other documents from the same author as the Document 305.

In some embodiments, as illustrated, the Keyword System 110 can also identify a set of frequent or important keywords for the author, and determine whether each newly-identified keyword is reflected on this list. Similarly, in some embodiments, the Keyword System 110 can identify, for each genre or type of document, a set of known or common keywords. In one such embodiment, the Keyword System 110 can determine whether each newly-identified keyword is reflected in this genre-specific list.

In the illustrated embodiment, if a match is found at block 325 (e.g., because the keyword is associated with one or more other documents from the author and/or one or more genres), the Keyword System 110 can map the new keyword to these related instances (at block 355). This can enable the Keyword System 110 to generate mappings between different documents and contexts in order to provide a more complete understanding.

If, at block 325, no match is identified, the workflow 300 continues to block 330. At block 330, the Keyword System 110 determines whether any synonyms of the identified (unmatched) keyword(s) are reflected in the Repository 320. In an embodiment, as discussed above, these synonyms can be used to provide deeper context in order to enable a more rapid and complete understanding of new keywords. If such synonyms are found, the Keyword System 110 can map them (in block 350).

If no synonyms are found, in the illustrated embodiment, the Keyword System 110 determines (at block 335) whether the keyword is a regional-specific term (e.g., a foreign language, a local term such as the name of a city, and the like). If the keyword has regional meaning, the Keyword System 110 can map it (at block 350) to this regional meaning in order to provide appropriate context.

As illustrated, if no such local meaning is found, the Keyword System 110 can determine (at block 340) whether the keyword is reflected in any social media reviews or posts. For example, the keyword may be commonly reflected in reviews posted by other users who have read or reviewed the Document 305. If so, such reviews may be useful context for understanding the keyword, and the Keyword System 110 can map the newly-identified keyword to this context (at block 350).

In the illustrated workflow 300, if none of the above evaluations result in a successful mapping, the Keyword System 110 can request and/or receive (at block 345) a meaning or context for the keyword from one or more users. For example, in one embodiment, the Keyword System 110 may ask the user whether they are familiar with the keyword, or may ask other users whether they are familiar. If so, the returned information can be mapped as the context for the keyword.

As illustrated, regardless of where the mapping originates, the Keyword System 110 can update the Repository 320 based on the updated mappings. This can allow the Keyword System 110 to dynamically and constantly update its mappings to reflect new understanding, which ensures that the Keyword System 110 can parse future documents efficiently and accurately to extract meaningful context.

Finally, at block 355, the Keyword System 110 displays one or more summaries based on the keywords and/or the mapped context, along with the keywords themselves. In at least one embodiment, the Keyword System 110 only uses the unknown keywords in generating the summary. This allows the user to focus their review on the unknown concepts. In some embodiments, the Keyword System 110 can output all keywords with a particular emphasis placed on the unknown keywords (e.g., by presenting them first, by highlighting them or providing some other visual emphasis, and the like). This allows the user to quickly review the keywords and corresponding context, and better understand the Document 305.

Figure 4:
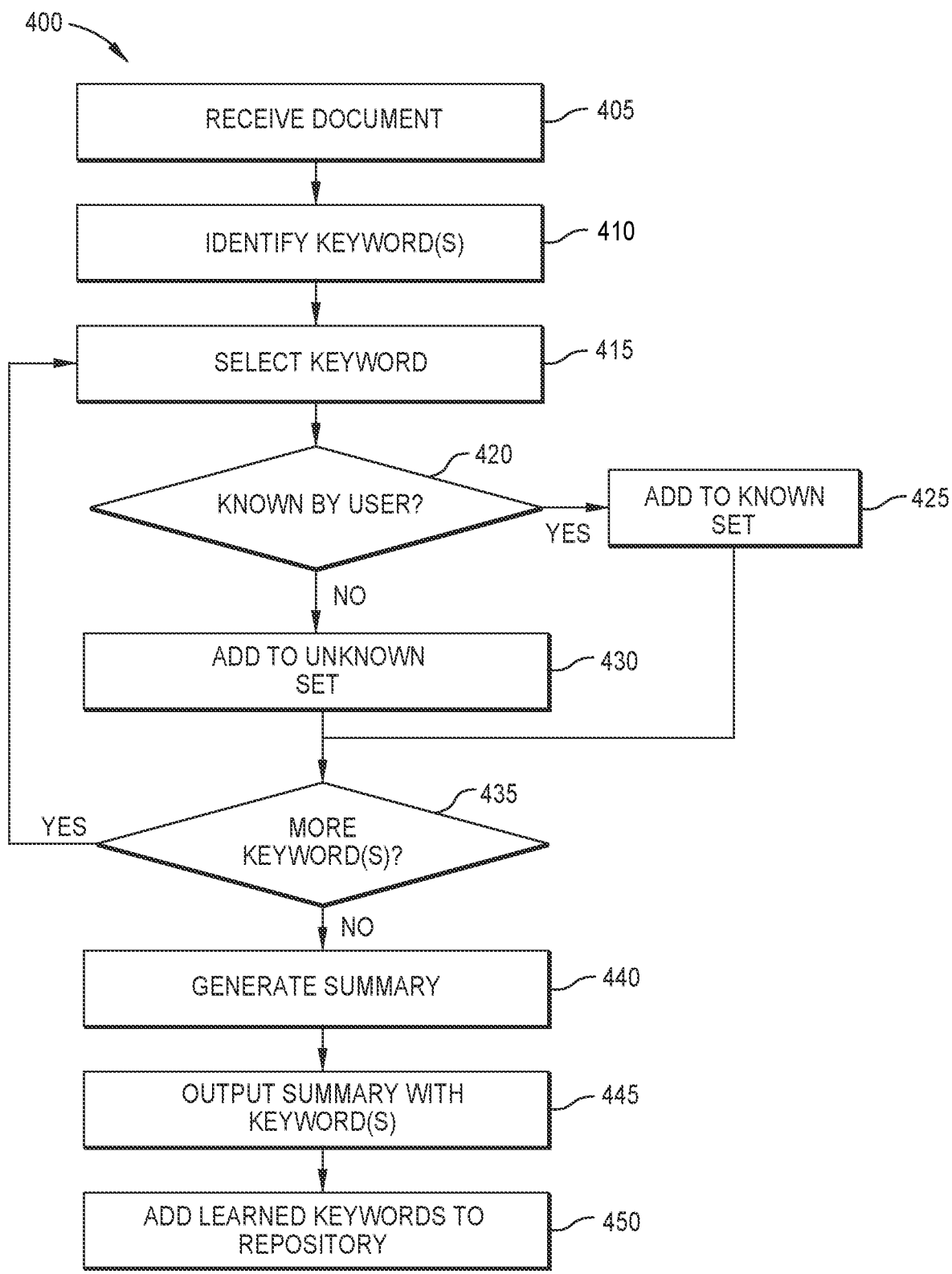
FIG. 4 is a flow diagram illustrating a method of extracting data from text and generating summaries, according to some embodiments disclosed herein.

FIG. 4 is a flow diagram illustrating a method 400 of extracting data from text and generating summaries, according to some embodiments disclosed herein. The method 400 begins at block 405, where the Keyword System 110 receives a document. In an embodiment, the document comprises textual data in one or more natural languages. In at least one embodiment, the document is an electronic representation of text.

At block 410, the Keyword System 110 can evaluate the document to identify and extract a set of keywords, as discussed above. In at least one embodiment, the Keyword System 110 uses a recurrent neural network to extract the keywords.

The method 400 then continues to block 415, where the Keyword System 110 selects one of the extracted keywords. In an embodiment, this selection may be performed in any suitable manner, as the Keyword System 110 will iteratively evaluate each keyword while performing the method 400. In at least one embodiment, the Keyword System 110 can evaluate the keywords sequentially (e.g., in the order they appear in the document).

At block 420, the Keyword System 110 determines whether the selected keyword is known by the user. For example, the Keyword System 110 may search a set of known keywords associated with the user. In some embodiments, the Keyword System 110 can maintain, for each user, a set of known keywords. This set may be updated as each user consumes new documents and learns knew keywords. In some embodiments, as part of determining whether a given keyword is known, the Keyword System 110 can also determine whether any synonyms of the keyword are found on the user's known keyword list.

If, at block 420, the Keyword System 110 determines that the selected keyword is not known to the user, the method 400 continues to block 430 where the Keyword System 110 adds the selected keyword to a set of unknown keywords. In some embodiments, this set of unknown keywords can be used to generate some or all of the output in order to focus the user's review on the new and unknown concepts. The method 400 then continues to block 435.

If, at block 420, the Keyword System 110 determines that the selected keyword (or a synonym) is already known to the user, the method 400 continues to block 425. At block 425, the Keyword System 110 adds the selected keyword to a set of known keywords for the received document.

This allows the Keyword System 110 to dynamically maintain a set of keywords that are known, as well as a set of keywords that are unknown, for the given document. In embodiments, this can enable the Keyword System 110 to generate better summaries for the specific user. For example, in generating a summary, the Keyword System 110 may focus on unknown keywords as the initial layer, but rely on known keywords when providing additional context (e.g., when a user selects one or more unknown keywords for review).

At block 435, the Keyword System 110 generates one or more summaries for the document based on the keywords. In some embodiments, the summary includes a sequential list of the identified keywords. In at least one embodiment, the summary includes only the unknown keywords. That is, the Keyword System 110 may refrain from presenting the known keywords, because doing so would consume time and focus that is not beneficial. In some embodiments, generating the summary includes indicating context surrounding one or more of the unknown keywords. This can allow the user to quickly review and understand each such keyword.

The method 400 then continues to block 445, where the Keyword System 110 outputs the summary and/or keyword(s) to the user (e.g., via a GUI). The user can use this GUI to review the keywords and summaries in order to gain a deeper understanding of the document.

As illustrated in block 450, in at least one embodiment, the Keyword System 110 can add each learned keyword to the repository as the user interacts with the GUI. For example, as the user reviews each unknown keyword and indicates understanding, the Keyword System 110 can update the repository to indicate that the keyword is known to the user (e.g., by updating the user-specific list of known words). This allows the Keyword System 110 to customize its output for future documents the user wishes to review.

Figure 5:
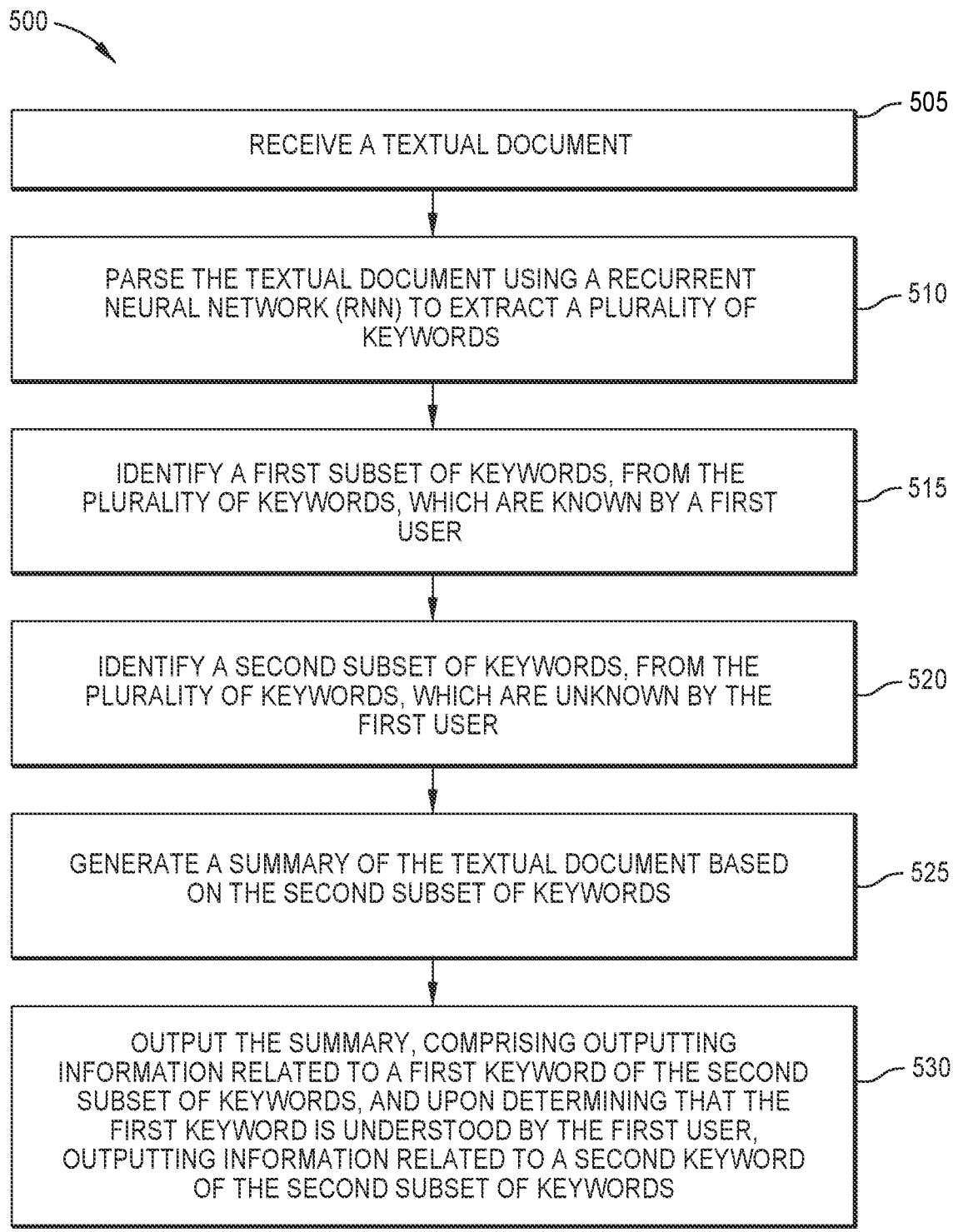
FIG. 5 is a flow diagram illustrating a method of extracting data from text, according to some embodiments disclosed herein.

FIG. 5 is a flow diagram illustrating a method 500 of extracting data from text, according to some embodiments disclosed herein. The method 500 begins at block 505, where a keyword system receives a textual document.

At block 510, the keyword system parses the textual document using a recurrent neural network (RNN) to extract a plurality of keywords.

The method 500 then continues to block 515, where the keyword system identifies a first subset of keywords, from the plurality of keywords, which are known by a first user.

Similarly, at block 520, the keyword system identifies a second subset of keywords from the plurality of keywords, which are unknown by the first user.

The method 500 then proceeds to block 525, where the keyword system generates a summary of the textual document based on the second subset of keywords.

At block 530, the keyword system then outputs the summary, comprising outputting information related to a first keyword of the second subset of keywords, and upon determining that the first keyword is understood by the first user, outputting information related to a second keyword of the second subset of keywords.

Figure 6:
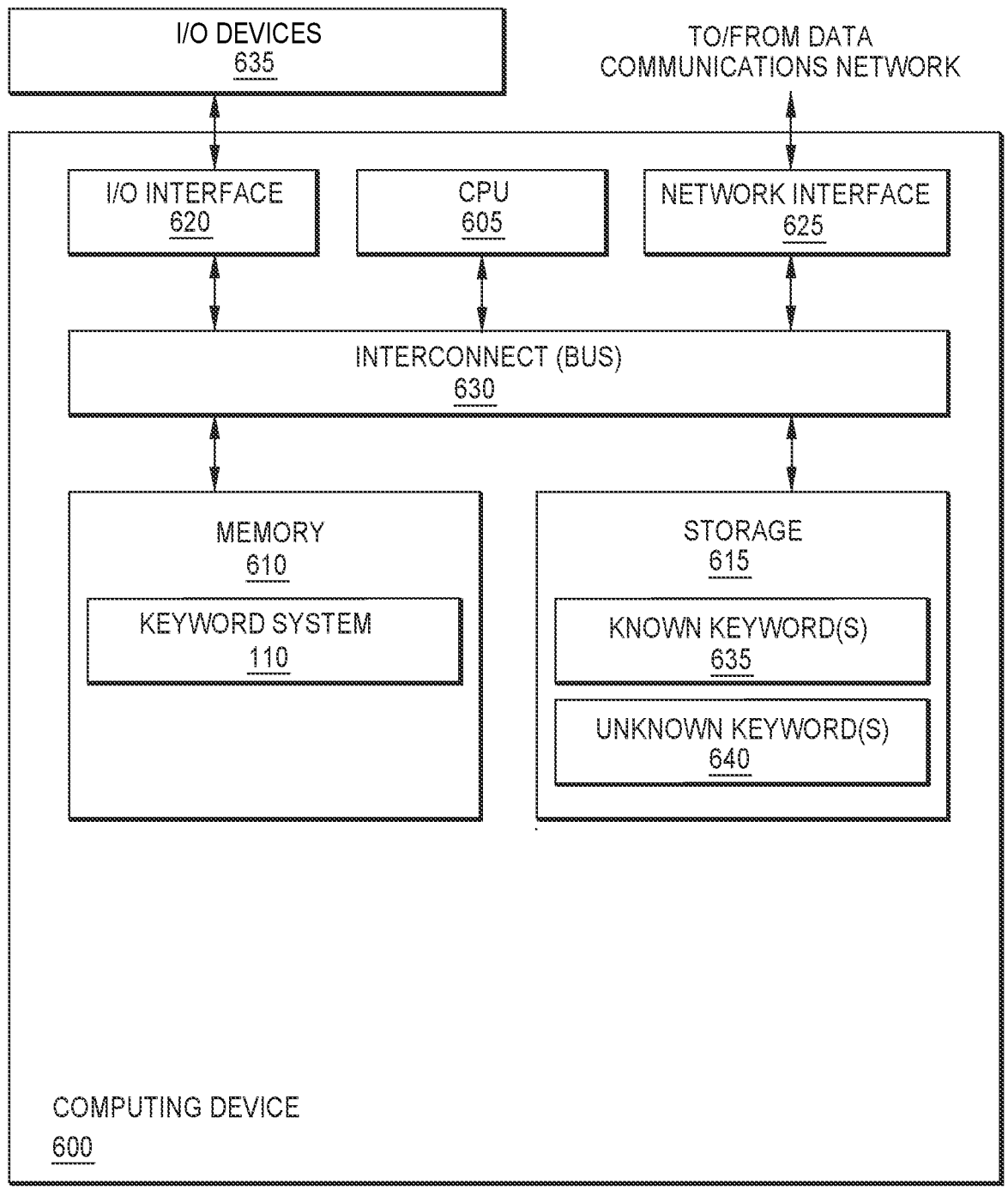
FIG. 6 is a block diagram illustrating a computing device configured to extract data from text and generate summaries, according to some embodiments disclosed herein.

FIG. 6 is a block diagram illustrating a Computing Device 600 configured to extract data from text and generate summaries, according to some embodiments disclosed herein. Although depicted as a physical device, in embodiments, the Computing Device 600 may be implemented using virtual device(s), and/or across a number of devices (e.g., in a cloud environment). As illustrated, the Computing Device 600 includes a CPU 605, Memory 610, Storage 615, a Network Interface 625, and one or more I/O Interfaces 620. In the illustrated embodiment, the CPU 605 retrieves and executes programming instructions stored in Memory 610, as well as stores and retrieves application data residing in Storage 615. The CPU 605 is generally representative of a single CPU and/or GPU, multiple CPUs and/or GPUs, a single CPU and/or GPU having multiple processing cores, and the like. The Memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 635 (such as keyboards, monitors, etc.) are connected via the I/O Interface(s) 620. Further, via the Network Interface 625, the Computing Device 600 can be communicatively coupled with one or more other devices and components (e.g., via a network, which may include the Internet, local network(s), and the like). As illustrated, the CPU 605, Memory 610, Storage 615, Network Interface(s) 625, and I/O Interface(s) 620 are communicatively coupled by one or more Buses 630.

In the illustrated embodiment, the Storage 615 includes a set of one or more Known Keywords 635 for a particular user, as well as a set of Unknown Keywords 640. Although depicted as residing in Storage 615, in embodiments, the Known Keywords 635 and Unknown Keywords 640 may reside in any suitable location. In an embodiment, the Known Keywords 635 and Unknown Keywords 640 represent concepts that are known and unknown, respectively, to a given user.

In the illustrated embodiment, the Memory 610 includes a Keyword System 110, described in more detail above. Although depicted as software residing in Memory 610, in embodiments, the functionality of the Keyword System 110 may be implemented using software, hardware, or a combination of software and hardware.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Keyword System 110) or related data available in the cloud. For example, the Keyword System 110 could execute on a computing system in the cloud and evaluate data to identify relevant keywords and generate corresponding summaries. In such a case, the Keyword System 110 could parse text and store extracted keywords at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
  receiving a textual document;
  parsing the textual document using a recurrent neural network (RNN) to extract a plurality of keywords;
  identifying a first subset of keywords, from the plurality of keywords, which are known by a first user;
  identifying a second subset of keywords, from the plurality of keywords, which are unknown by the first user;
  generating a summary of the textual document based on the second subset of keywords; and
  outputting the summary, comprising:
    outputting information related to a first keyword of the second subset of keywords; and
    upon determining that the first keyword is understood by the first user, outputting information related to a second keyword of the second subset of keywords.

2. The method of claim 1, wherein parsing the textual document to extract the plurality of keywords is based at least in part on (i) a set of keywords associated with an author of the textual document, and (ii) a genre of the textual document.

3. The method of claim 1, wherein parsing the textual document to extract the plurality of keywords comprises:
  identifying a third keyword for a first sentence of the textual document by processing the first sentence using the RNN;
  identifying a fourth keyword for a second sentence of the textual document by processing the second sentence using the RNN; and
  generating the first keyword for a first paragraph of the textual document by processing the third and fourth keywords using the RNN, wherein the first paragraph includes the first and second sentences.

4. The method of claim 1, wherein parsing the textual document to extract the plurality of keywords comprises:
  upon determining that the first keyword is not known to the first user, identifying one or more synonyms of the first keyword; and
  upon determining that at least one of the one or more synonyms is known to the first user, mapping the first keyword and the at least one of the one or more synonyms.

5. The method of claim 1, wherein parsing the textual document to extract the plurality of keywords comprises:
  upon determining that the first keyword is not known to the first user, determining whether the first keyword has a regional meaning; and
  upon determining that first keyword has a regional meaning, mapping the first keyword to the regional meaning.

6. The method of claim 1, wherein parsing the textual document to extract the plurality of keywords comprises:
  upon determining that the first keyword is not known to the first user, determining whether the first keyword has meaning in one or more social media platforms; and
  upon determining that first keyword has a meaning in one or more social media platforms, mapping the first keyword to the meaning from the social media platforms.

7. The method of claim 1, wherein parsing the textual document to extract the plurality of keywords comprises:
  upon determining that the first keyword is not known to the first user, requesting a meaning for the first keyword; and
  mapping the first keyword to the requested meaning.

8. One or more computer-readable storage media collectively containing computer program code that, when executed by operation of one or more computer processors, performs an operation comprising:

receiving a textual document;

parsing the textual document using a recurrent neural network (RNN) to extract a plurality of keywords;

identifying a first subset of keywords, from the plurality of keywords, which are known by a first user;

identifying a second subset of keywords, from the plurality of keywords, which are unknown by the first user;

generating a summary of the textual document based on the second subset of keywords; and outputting the summary, comprising:

outputting information related to a first keyword of the second subset of keywords; and upon determining that the first keyword is understood by the first user, outputting information related to a second keyword of the second subset of keywords.

9. The computer-readable storage media of claim 8, wherein parsing the textual document to extract the plurality of keywords is based at least in part on (i) a set of keywords associated with an author of the textual document, and (ii) a genre of the textual document.

10. The computer-readable storage media of claim 8, wherein parsing the textual document to extract the plurality of keywords comprises:

identifying a third keyword for a first sentence of the textual document by processing the first sentence using the RNN;

identifying a fourth keyword for a second sentence of the textual document by processing the second sentence using the RNN; and generating the first keyword for a first paragraph of the textual document by processing the third and fourth keywords using the RNN, wherein the first paragraph includes the first and second sentences.

11. The computer-readable storage media of claim 8, wherein parsing the textual document to extract the plurality of keywords comprises:

upon determining that the first keyword is not known to the first user, identifying one or more synonyms of the first keyword; and upon determining that at least one of the one or more synonyms is known to the first user, mapping the first keyword and the at least one of the one or more synonyms.

12. The computer-readable storage media of claim 8, wherein parsing the textual document to extract the plurality of keywords comprises:

upon determining that the first keyword is not known to the first user, determining whether the first keyword has a regional meaning; and upon determining that first keyword has a regional meaning, mapping the first keyword to the regional meaning.

13. The computer-readable storage media of claim 8, wherein parsing the textual document to extract the plurality of keywords comprises:

upon determining that the first keyword is not known to the first user, determining whether the first keyword has meaning in one or more social media platforms; and upon determining that first keyword has a meaning in one or more social media platforms, mapping the first keyword to the meaning from the social media platforms.

14. The computer-readable storage media of claim 8, wherein parsing the textual document to extract the plurality of keywords comprises:

upon determining that the first keyword is not known to the first user, requesting a meaning for the first keyword; and mapping the first keyword to the requested meaning.

15. A system comprising:

one or more computer processors; and one or more memories collectively containing one or more programs which when executed by the one or more computer processors performs an operation, the operation comprising:

receiving a textual document;

parsing the textual document using a recurrent neural network (RNN) to extract a plurality of keywords;

identifying a first subset of keywords, from the plurality of keywords, which are known by a first user;

identifying a second subset of keywords, from the plurality of keywords, which are unknown by the first user;

generating a summary of the textual document based on the second subset of keywords; and outputting the summary, comprising:

outputting information related to a first keyword of the second subset of keywords; and upon determining that the first keyword is understood by the first user, outputting information related to a second keyword of the second subset of keywords.

16. The system of claim 15, wherein parsing the textual document to extract the plurality of keywords comprises:

identifying a third keyword for a first sentence of the textual document by processing the first sentence using the RNN;

identifying a fourth keyword for a second sentence of the textual document by processing the second sentence using the RNN; and generating the first keyword for a first paragraph of the textual document by processing the third and fourth keywords using the RNN, wherein the first paragraph includes the first and second sentences.

17. The system of claim 15, wherein parsing the textual document to extract the plurality of keywords comprises:

upon determining that the first keyword is not known to the first user, identifying one or more synonyms of the first keyword; and upon determining that at least one of the one or more synonyms is known to the first user, mapping the first keyword and the at least one of the one or more synonyms.

18. The system of claim 15, wherein parsing the textual document to extract the plurality of keywords comprises:

upon determining that the first keyword is not known to the first user, determining whether the first keyword has a regional meaning; and upon determining that first keyword has a regional meaning, mapping the first keyword to the regional meaning.

19. The system of claim 15, wherein parsing the textual document to extract the plurality of keywords comprises:

upon determining that the first keyword is not known to the first user, determining whether the first keyword has meaning in one or more social media platforms; and upon determining that first keyword has a meaning in one or more social media platforms, mapping the first keyword to the meaning from the social media platforms.

20. The system of claim 15, wherein parsing the textual document to extract the plurality of keywords comprises:

upon determining that the first keyword is not known to the first user, requesting a meaning for the first keyword; and mapping the first keyword to the requested meaning.

* * * * *